(12) United States Patent
Richardson et al.

(10) Patent No.: US 6,874,014 B2
(45) Date of Patent: Mar. 29, 2005

(54) CHIP MULTIPROCESSOR WITH MULTIPLE OPERATING SYSTEMS

(75) Inventors: Stephen E. Richardson, Los Altos, CA (US); Gary Vondran, San Carlos, CA (US); Stuart Siu, Castro Valley, CA (US); Paul Keltcher, Sunnyvale, CA (US); Shankar Venkataraman, Cupertino, CA (US); Padmanabha Venkitakrishnan, Sunnyvale, CA (US); Joseph Ku, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 09/865,605

(22) Filed: May 29, 2001

(65) Prior Publication Data

US 2002/0184328 A1 Dec. 5, 2002

(51) Int. Cl.[7] .................................................. G06F 11/00
(52) U.S. Cl. ....................... 709/213; 709/222; 711/173; 713/2; 718/1; 719/313
(58) Field of Search ................................. 709/220, 222, 709/213–215; 711/173, 147, 153; 713/2; 718/1, 105; 719/313; 714/6, 10

(56) References Cited

U.S. PATENT DOCUMENTS

| | | | | |
|---|---|---|---|---|
| 4,709,325 A | * | 11/1987 | Yajima | 714/10 |
| 5,201,040 A | * | 4/1993 | Wada et al. | 711/147 |
| 5,301,324 A | * | 4/1994 | Dewey et al. | 718/105 |
| 5,446,841 A | * | 8/1995 | Kitano et al. | 709/213 |
| 5,513,346 A | * | 4/1996 | Satagopan et al. | 714/48 |
| 6,075,938 A | | 6/2000 | Bugnion et al. | 703/27 |
| 6,108,731 A | * | 8/2000 | Suzuki et al. | 710/301 |
| 6,314,501 B1 | * | 11/2001 | Gulick et al. | 711/153 |
| 6,526,462 B1 | * | 2/2003 | Elabd | 710/242 |
| 6,658,591 B1 | * | 12/2003 | Arndt | 714/6 |
| 6,772,241 B1 | * | 8/2004 | George et al. | 710/36 |

* cited by examiner

*Primary Examiner*—Nasser Moazzami

(57) ABSTRACT

Multiple processors are mounted on a single die. The die is connected to a memory storing multiple operating systems or images of multiple operating systems. Each of the processors or a group of one or more of the processors is operable to execute a distinct one of the multiple operating systems. Therefore, resources for a single operating system may be dedicated to one processor or a group of processors. Consequently, a large number of processors mounted on a single die can operate efficiently.

19 Claims, 4 Drawing Sheets

CHIP MULTIPROCESSOR WITH MULTIPLE OPERATING SYSTEMS

FIELD OF THE INVENTION

The present invention is generally related to a computer chip architecture having multiple processors on a single die. More particularly, the present invention is related to a multiprocessing chip utilizing multiple operating systems.

BACKGROUND OF THE INVENTION

Existing internet data centers (IDCs) pack hundreds of processors (e.g., servers and the like) in a single building for processing a large volume of data transactions. Generally, the compute density or number of nodes per volume defines the efficiency of the IDC. The compute density effects the amortization of the high cost of the IDC infrastructure (e.g., networking, power, cooling, maintenance, reliability, and availability support). Typically, the greater the compute density, the better the IDC will be able to amortize the high cost of IDC infrastructure. Accordingly, a large compute density may be preferred. However, space may be unavailable or costly for locating a large number of processors necessary for maintaining a large compute density.

To provide increased compute density, multiprocessing schemes that utilize multiple processors have been developed. One conventional multiprocessing scheme (shown in FIG. 1) includes a computer system 100 having multiple processors 10–40, each on a separate die (i.e., chip) 50–80, and connected to a single operating system 90 stored in a memory 95. The system 100 may conserve space if the system is provided in a single housing.

A second conventional multiprocessing scheme (shown in FIG. 2) includes a computer system 200 having a chip multiprocessor 295. The chip multiprocessor includes multiple processors 210–240 on a single die 290. Similar to the processors 10–40 in system 100, the processors 210–240 are connected to a single operating system 250 stored in a memory 260. The processors 210–240 may communicate with the memory 260 via a bus 270. System 200 conserves space by providing multiple processors on a single die. However, the systems 100 and 200 suffer from well known scalability problems.

Schemes that have placed multiple processors on a single chip typically utilize a single operating system for tying all the processors together. A well known limitation of this scheme and other multiprocessing schemes utilizing a single operating system is that an operating system does not scale well to large numbers of processors. That is, as the number of processors managed by a single operating system increases, the efficiency of the operating system goes down dramatically. For example, an operating system typically includes internal data structures that may be limited in the number of processors that can be supported, and limited bandwidth on a bus may slow transactions. Thus, scaling becomes impractical above some small number (e.g., currently about four to at most 64 processors, depending on the operating system in question).

Bugnion et al., in U.S. Pat. No. 6,075,938, discloses using a cache coherent non-uniform memory architecture (CC-NUMA) that supports multiple processors executing multiple operating systems. However, Bugnion et al. discloses multiple virtual processors, implemented in software on a single physical processor. This architecture fails to provide multiple physical processors, implemented in hardware, on a single die. Accordingly, this architecture suffers a performance penalty, because the single physical processor must task switch among multiple virtual processors (only one virtual processor can be running on the physical processor at any given time). Moreover, if this architecture were to support multiple physical processors, it would need space for providing multiple dies, and processing speed would consequently be sacrificed due to the input/output procedures needed to communicate among the multiple separate processors and the memory.

SUMMARY OF THE INVENTION

An aspect of the present invention is to provide a multiprocessing system including multiple processors mounted on a single die. The multiple processors are connected to a memory storing multiple operating systems. Each of the multiple processors may execute one of the multiple operating systems.

Another aspect of the present invention is to provide a multiprocessing system including a plurality of processor groups mounted on a single die. The processor groups are connected to a memory storing multiple operating systems. Each of the processor groups may execute one of the multiple operating systems. The processor group may include one or more processors mounted on the die.

Certain embodiments of the present invention are capable of achieving certain advantages, including some or all of the following: mounting multiple processors on a single die reduces the cabling problem inherent in connecting multiple processors on separate dies in separate housings; mounting multiple processors on a single die reduces the latency required for communication among the processors and improves the efficiency of message passing, potentially enabling a whole new class of applications (e.g., data mining) to run on such a multiprocessing system; mounting multiple processors on a single die reduces chip-to-chip communication costs and leads to further power efficiency; and increased scalability for multiprocessing.

Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
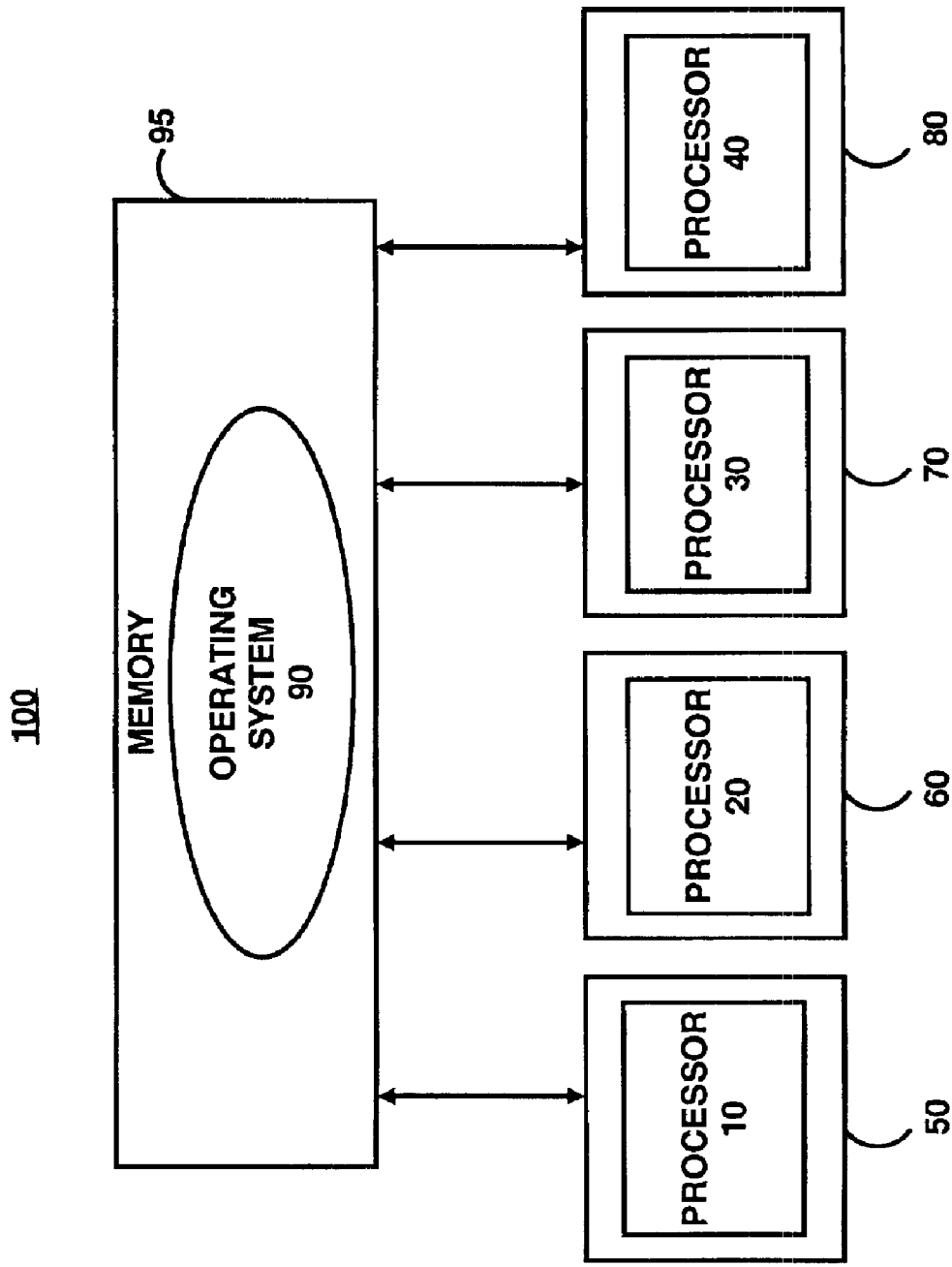
FIG. 1 illustrates a conventional multiprocessing scheme including multiple processors, each on a separate die.
Figure 2:
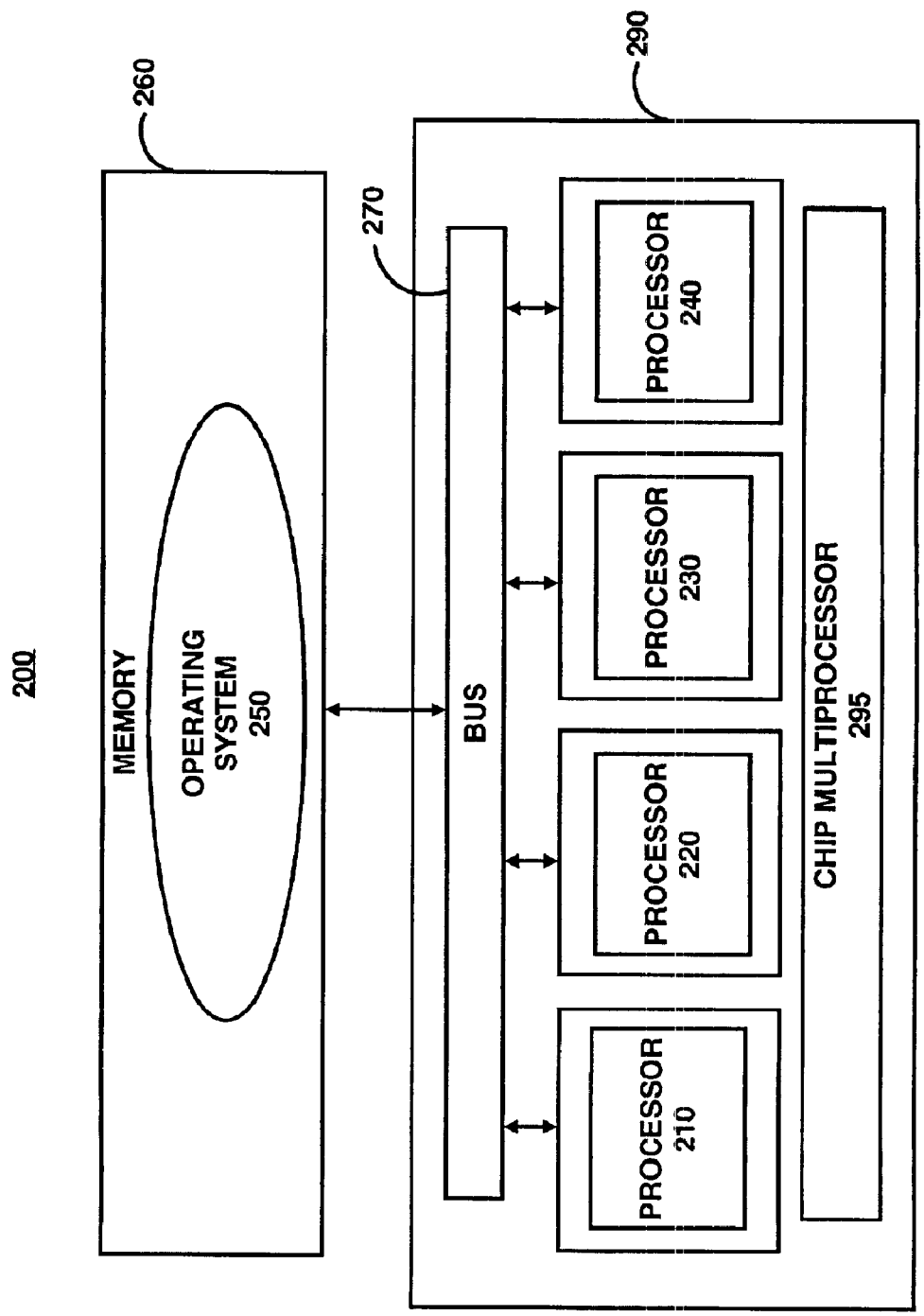
FIG. 2 illustrates a conventional multiprocessing scheme including multiple processors on a single die.
Figure 3:
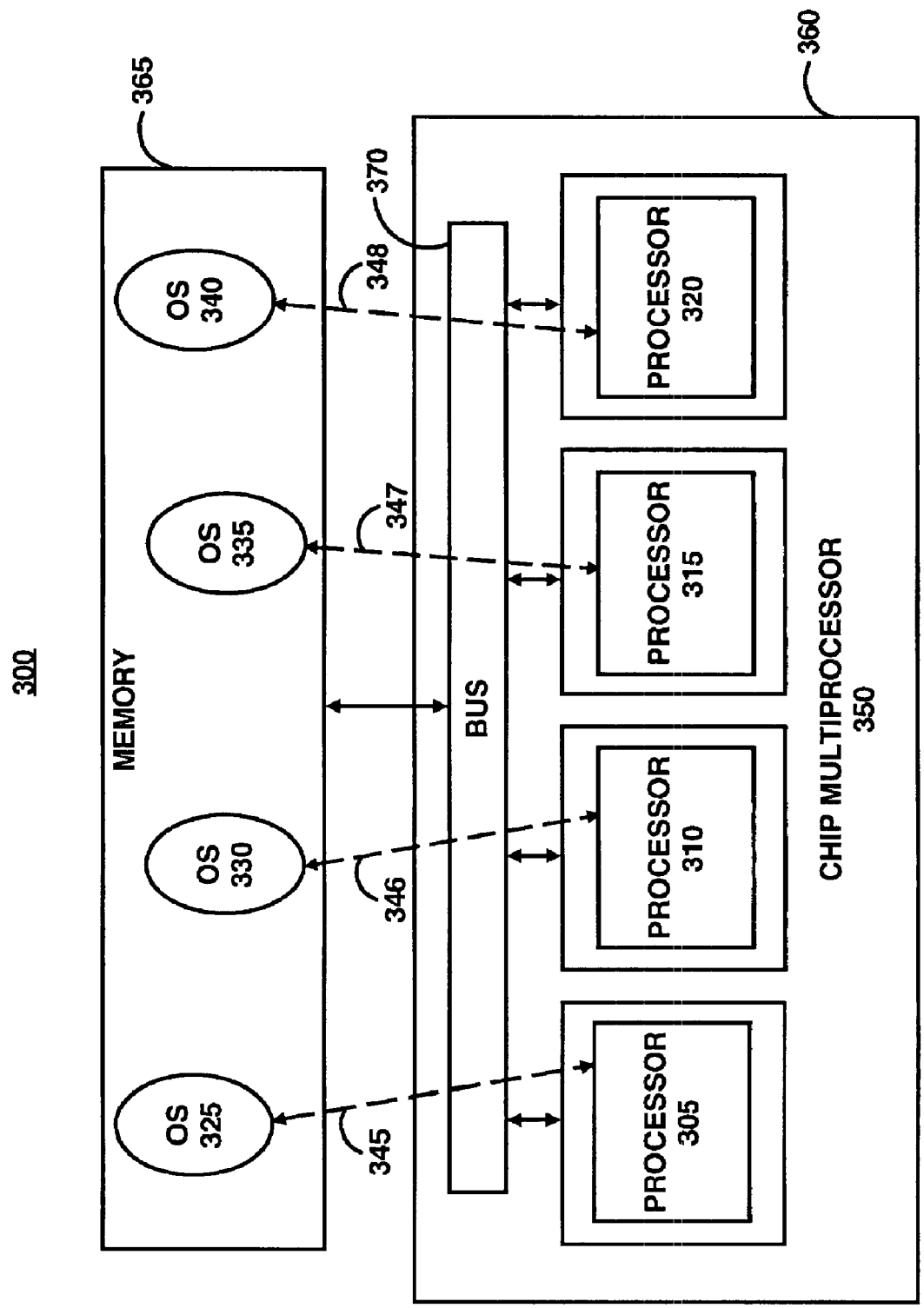
FIG. 3 illustrates an embodiment of a multiprocessing scheme employing the principles of the present invention.

FIG. 3 illustrates an embodiment including a computer system 300 employing the principles of the present invention. System 300 includes a chip multiprocessor 350 having multiple processors 305–320 mounted on a single die 360. The processors 305–320 function with operating systems 325–340 respectively, as illustrated by connections 345–348. The operating systems 325–340 are stored in a memory 365. During operation, each processor 305–320 may access a respective operating system 325–340 by communicating with the memory 365, for example, via a bus 370. Alternatively, each processor may be directly connected to the memory 365 without using the bus 370. The memory 365 may include one or more of the following: SRAM and/or DRAM on the same chip as one or more processors; SRAM and/or DRAM on separate chips connected to one or more processors; magnetic media, such as tape or disk; optical media, such as CD-ROM; and the like.

Figure 4:
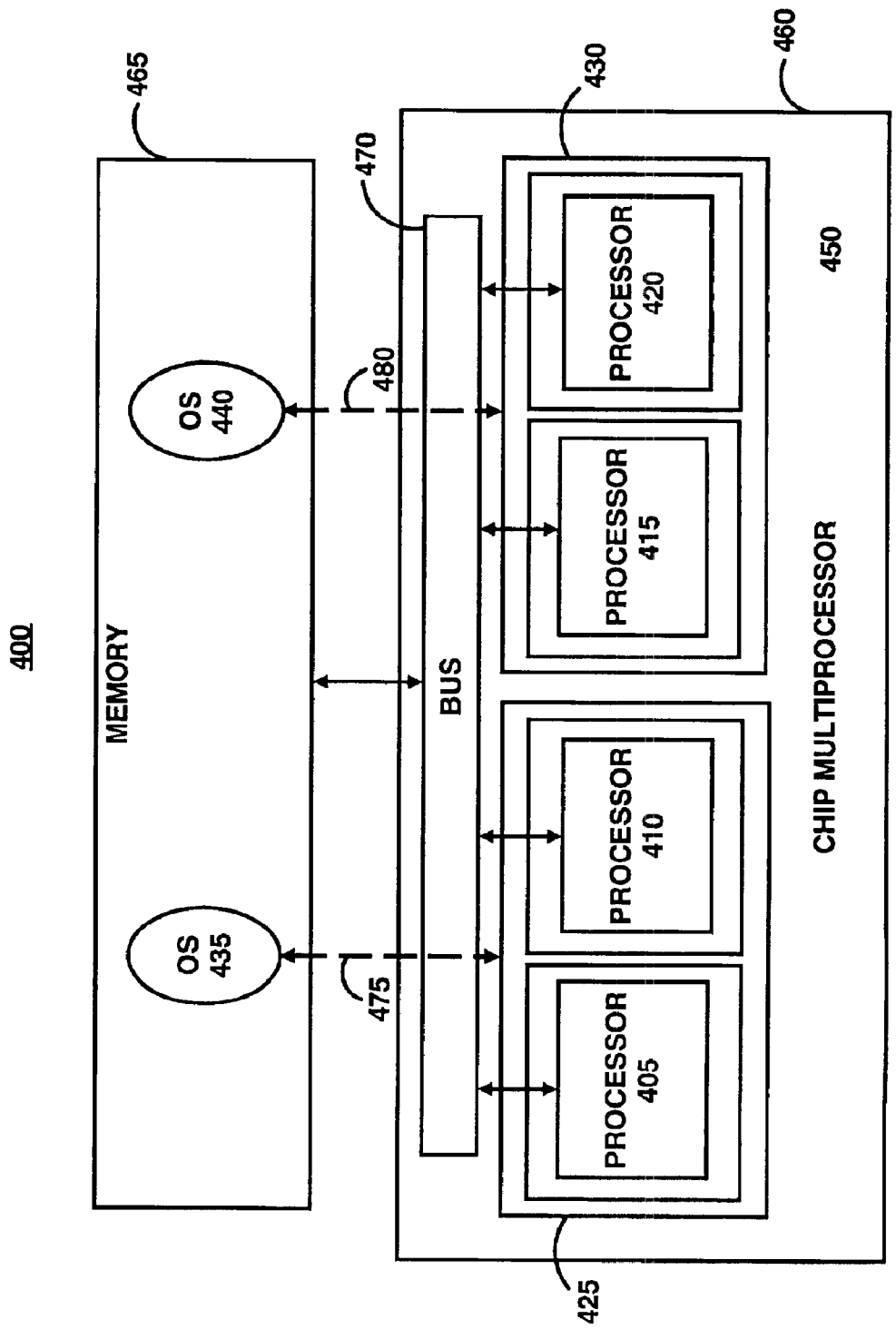
FIG. 4 illustrates another embodiment of a multiprocessing scheme employing the principles of the present invention.

Processors 305–320 may be configured, such that each processor executes its own operating system. Multiple processors (e.g., multiple processors in a processor group) may also be configured to execute a single operating system. FIG. 4 illustrates a second embodiment including a computer system 400 employing the principles of the present invention. System 400 includes a chip multiprocessor 450 having multiple processors 405–420 mounted on a single die 460. The processors 405–420 are divided into two processor groups 425 and 430 having processors 405 and 410 in the processor group 425 and processors 415 and 420 in the processor group 430. The processor group 425 executes an operating system 435 stored in a memory 465 (as illustrated by a connection 475), and the processor group 430 executes an operating system 440 stored in the memory 465 (as illustrated by a connection 480). During operation, each processor group 425–430 may access a respective operating system 435–440 by communicating with the memory 465, for example, via a bus 470. Alternatively, each processor and/or processor group may be directly connected to the memory 465 without using the bus 470.

The operating systems shown in FIGS. 3–4 and described above may include conventional operating systems, such as WINDOWS NT, UNIX and the like, and the processors in systems 300 and 400 may include conventional processors. Each processor may be capable of executing a single operating system, or capable of simultaneously executing multiple operating systems, for example, by context switching, which may include rapidly switching between multiple operating systems. Systems 300 and 400 may be operable to execute a variety of applications, such as web service, database service and the like. Four processors are shown in FIGS. 3–4 for illustration purposes, and it will be apparent to one of ordinary skill in the art that more or less processors and/or processor groups may be included on the dies 360 and 460. Additionally, as is known in the art, the processors in systems 300 and 400 may access one or more caches (not shown).

It will be apparent to one of ordinary skill in the art that a system employing the principles of the present invention may be operable to support both processor groups and processors on a single die, such that each processor group and processor not within a processor group executes a distinct operating system.

Having each processor (or processor group) executing its own independent operating system minimizes scaling problems realized when utilizing a single operating system with multiple processors. For example, one hundred processors independently executing one hundred operating systems may be no more of a problem than one processor executing one operating system. The embodiments described above are operable to provide this type of scaling on a single chip.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A multiprocessing system comprising:
multiple processors mounted on a single die; and
multiple operating systems residing in a memory connected to said multiple processors,
wherein each of said multiple processors executes an operating system of said multiple operating systems, and two or more of said multiple processors are capable of simultaneously executing two or more operating systems of said multiple operating systems.

2. The system of claim 1, wherein at least one of said processors is operable to execute two or more of said multiple operating systems simultaneously.

3. The system of claim 1, wherein said multiple processors are connected to said memory via a bus to execute said multiple operating systems.

4. The system of claim 1, wherein said multiple processors are directly connected to said memory to execute said multiple operating systems.

5. The system of claim 1, wherein each of said processors executes a distinct operating system of said multiple operating systems.

6. The system of claim 1, further comprising multiple processor groups, wherein each processor group includes at least two of said multiple processors executing one of said multiple operating systems.

7. A multiprocessing system comprising:
a plurality of processor groups mounted on a single die; and
multiple operating systems residing in a memory connected to said groups, wherein each of said groups executes an operating system of said multiple operating systems, and two or more of said plurality of processor groups are capable of simultaneously executing two or more operating systems of said multiple operating systems.

8. The system of claim 7, wherein each of said groups includes multiple processors.

9. The system of claim 8, wherein said multiple processors in each of said groups are connected to said memory via a bus to execute said multiple operating systems.

10. The system of claim 8, wherein said multiple processors in each of said groups are directly connected to said memory to execute said multiple operating systems.

11. The system of claim 7, wherein each of said groups executes a distinct operating system of said multiple operating systems.

12. A multiprocessing apparatus comprising:
processor means for executing a plurality of operating system means, wherein said processor means includes a plurality of processors mounted on a single die, and wherein said processor means is operable to simultaneously execute two or more operating system means of said plurality of operating system means; and memory means for storing said plurality of operating system means.

13. The apparatus of claim 12, wherein said processor means is connected to said memory means via a bus to execute said multiple operating systems.

14. The apparatus of claim 12, wherein said processor means is directly connected to said memory means to execute said multiple operating systems.

15. The apparatus of claim 12, wherein each of said processors of said processor means is operable to execute a distinct one of said plurality of operating system means.

16. The apparatus of claim 12, wherein said processor means includes a plurality of processor group means, wherein each processor group means includes at least two of said plurality of processors.

17. The apparatus of claim 16, wherein said plurality of processor group means is operable to execute one or more of said plurality of operating system means.

18. The apparatus of claim 16, wherein each of said plurality of processor group means is operable to execute a distinct one of said plurality of operating system means.

19. The apparatus of claim 12, wherein at least one of said plurality of processors is operable to simultaneously execute two or more of said plurality of operating system means.

* * * * *